United States Patent
Machani et al.

(10) Patent No.: US 8,560,849 B2
(45) Date of Patent: *Oct. 15, 2013

(54) METHOD AND SYSTEM FOR SECURE COMMUNICATION USING HASH-BASED MESSAGE AUTHENTICATION CODES

(75) Inventors: Salah Machani, Thornhill (CA); Jun Sun, Mississauga (CA); Konstantin Teslenko, Maple (CA)

(73) Assignee: Diversinet Corp., Toronto (CA)

( * ) Notice: Subject to any disclaimer, the term of this patent is extended or adjusted under 35 U.S.C. 154(b) by 136 days.

This patent is subject to a terminal disclaimer.

(21) Appl. No.: 13/069,556

(22) Filed: Mar. 23, 2011

(65) Prior Publication Data

US 2011/0238989 A1    Sep. 29, 2011

(30) Foreign Application Priority Data

Mar. 24, 2010   (CA) ..................................... 2697687

(51) Int. Cl.
*H04L 9/32*    (2006.01)

(52) U.S. Cl.
USPC .............. 713/168; 713/155; 380/229; 705/67

(58) Field of Classification Search
None
See application file for complete search history.

(56) References Cited

U.S. PATENT DOCUMENTS

| | | | | |
|---|---|---|---|---|
| 7,069,438 B2* | 6/2006 | Balabine et al. | | 713/168 |
| 7,266,837 B2* | 9/2007 | Monjas-Llorente et al. | | 726/2 |
| 7,284,127 B2* | 10/2007 | Gehrmann | | 713/169 |
| 7,409,522 B1* | 8/2008 | Fair et al. | | 711/170 |
| 7,660,417 B2* | 2/2010 | Blom et al. | | 380/249 |
| 8,422,682 B2* | 4/2013 | Ortiz Cornet et al. | | 380/277 |
| 2002/0199102 A1* | 12/2002 | Carman et al. | | 713/168 |
| 2003/0037241 A1* | 2/2003 | Campagna | | 713/170 |
| 2006/0288209 A1* | 12/2006 | Vogler | | 713/168 |
| 2007/0130472 A1* | 6/2007 | Buer et al. | | 713/182 |
| 2008/0184350 A1* | 7/2008 | Chu | | 726/7 |
| 2011/0083015 A1* | 4/2011 | Meier | | 713/176 |
| 2011/0208965 A1* | 8/2011 | Machani | | 713/168 |

OTHER PUBLICATIONS

Tie et al., "Extended Security Analysis of Multi-hop Ticket Based Handover Authentication Protocol in the 802.16j Network," IEEE, Sep. 2012, pp. 1-10.*
Rahman et al., "A Hybrid Key Management Protocol for Wireless Sensor Networks," IEEE, Jun. 2012, pp. 769-776.*
Rogers et al. "A Lightweight Mechanism for Dependable Communication in Untrusted Networks," IEEE, Jun. 2007, pp. 430-439.*
Park et al. "Efficient Multicast Stream Authentication Using Erasure Codes," ACM, May 2003, pp. 258-285.*

* cited by examiner

*Primary Examiner* — Luu Pham
*Assistant Examiner* — Demaris Brown
(74) *Attorney, Agent, or Firm* — McMillan LLP

(57) ABSTRACT

A system and method for secure communication is provided. A first hash-based message authentication code is generated from a shared secret and a first counter value stored in storage of a computing device. A second hash-based message authentication code is generated from such shared secret and a second counter value. An encryption key is derived from a function of the first hash-based message authentication code and the second hash-based message authentication code. A message is encrypted using the encryption key, and communicated via a network interface of the computing device.

8 Claims, 6 Drawing Sheets

METHOD AND SYSTEM FOR SECURE COMMUNICATION USING HASH-BASED MESSAGE AUTHENTICATION CODES

FIELD OF THE INVENTION

The present invention relates generally to computer security. More particularly, the present invention relates to a method and system for secure communication.

BACKGROUND OF THE INVENTION

With the increase in client-server communications, as well as the increase in the value of the data being communicated, there is a corresponding increase in the want and need for secure protocols for those communications. The ubiquity of mobile computing devices (more simply, "mobile devices") and the functionality and data they access and store has increased this need. While there are existing secure data transport protocols, such as Secure Socket Layer ("SSL") or Transport Layer Security ("TLS"), they are not suitable for all communications, data and environments. Additionally, they often require additional user authentication.

One-time passwords ("OTPs") are gaining popularity as a secure method of user authentication, particularly for financial transactions. However, OTPs do not, by themselves, provide confidentiality of data.

One method of communicating securely is set out in Canadian Patent Application Number 2,590,989. The method set out therein is suitable for many scenarios, but the length of the passphrases used to derive the key for encrypt messages is relatively short. As a result, the encryption key can be less strong than desirable.

It is an object of this invention to provide a novel method and system for secure communication.

SUMMARY OF THE INVENTION

In accordance with an aspect of the invention, there is provided a method for secure communication, comprising:
generating a first hash-based message authentication code from a shared secret and a first counter value stored in storage of a computing device;
generating a second hash-based message authentication code from said shared secret and a second counter value;
deriving an encryption key from a first function of said first hash-based message authentication code and said second hash-based message authentication code;
encrypting a message using said encryption key; and
communicating said encrypted message via a network interface of said computing device.

The method can further include:
generating a one-time password using one of said first and second hash-based message authentication codes.

The method can further include:
communicating said one-time password to enable determination of one of said first and second counter values.

The first function can include at least a portion of a concatenation of said first and second hash-based message authentication codes.

The method can include:
combining said encryption key with an initialization vector for decrypting said message.

The encrypting can include:
generating an initialization vector as a second function of at least one of said first and second hash-based message authentication codes; and
encrypting said message using said encryption key concatenated with said initialization vector.

The generating can include setting the initialization vector as a portion of said second hash-based message authentication code.

The method can further include:
communicating an identifier for said shared secret and said counter with said encrypted message.

The method can further include:
receiving an encrypted response; and
decrypting said encrypted response using said encryption key.

In accordance with another aspect of the invention, there is provided a system for secure communication, comprising:
a computing device having a network interface for receiving a shared secret and a first counter value, a storage for storing said shared secret and said counter value, and a processor executing an encryption module, said encryption module generating a first hash-based message authentication code from said shared secret and said first counter value and a second hash-based message authentication code from said shared secret and a second counter value subsequent to said first counter value, said encryption module deriving an encryption key from a first function of said first hash-based message authentication code and said second hash-based message authentication code, and encrypting a message using said encryption key, said encryption module causing said network interface to communicate sent encrypted message.

The encryption module can generate a one-time password using one of the first and second hash-based message authentication codes.

The encryption module can indicate the one-time password via the network interface to enable determination of one of the first and second counter values.

The first function can include at least a portion of a concatenation of the first and second hash-based message authentication codes. The encryption module can combine the encryption key with an initialization vector for decrypting the message.

The encryption module can generate an initialization vector as a second function of at least one of the first and second hash-based message authentication codes, and encrypt the message using the encryption key concatenated with the initialization vector.

The encryption module can set the initialization vector as a portion of the second hash-based message authentication code.

The encryption module can communicate an identifier for the shared secret and the counter values with the encrypted message.

The encryption module can receive an encrypted response to the communication of the encrypted message, and decrypt the encrypted response using the encryption key.

In accordance with a further aspect of the invention, there is provided a method for secure communication, comprising:
generating a first hash-based message authentication code from a shared secret and a first counter value stored in storage of a computing device;
generating a second hash-based message authentication code from said shared secret and a second counter value;
deriving an encryption key from at least said first hash-based message authentication code;
generating an initialization vector from at least said second hash-based message authentication code;
encrypting a message using said encryption key and said initialization vector; and communicating said encrypted message via a network interface of said computing device.

The method can include generating a one-time password using one of the first and second hash-based message authentication codes. Further, the method can include communicating the one-time password to enable determination of one of the first and second counter values.

The deriving can include concatenating at least a portion of the first and second hash-based message authentication codes.

The generating of the initialization vector can include concatenating at least a portion of the first and second hash-based message authentication codes.

BRIEF DESCRIPTION OF THE DRAWINGS

An embodiment will now be described, by way of example only, with reference to the attached Figures, wherein.

DETAILED DESCRIPTION OF THE EMBODIMENT

The invention provides a system and method for secure communication between two computing devices. Two hash-based message authentication codes ("HMACs") are generated using a shared key and two counter values. A key for encrypting communications between two computing devices is then derived as a function of the two HMACs. As the amount of source data provided by the two HMACs is relatively large, the encryption key and an initialization vector to which it is concatenated can be made fairly strong. Further, an OTP generated using one of the two HMACs enables authentication of the initiating party's identity and synchronization of the counter values between the two communicating computing devices. By deriving an encryption key for encrypting communications between the computing devices using a relatively-long passphrase, the encryption key can be stronger and communications encrypted using the encryption key are less vulnerable to various types of cryptographic attacks. Further, as the encryption key is derived from an OTP, it can be dynamic, thereby making its use suitable in a variety of systems and methods.

Figure 1:
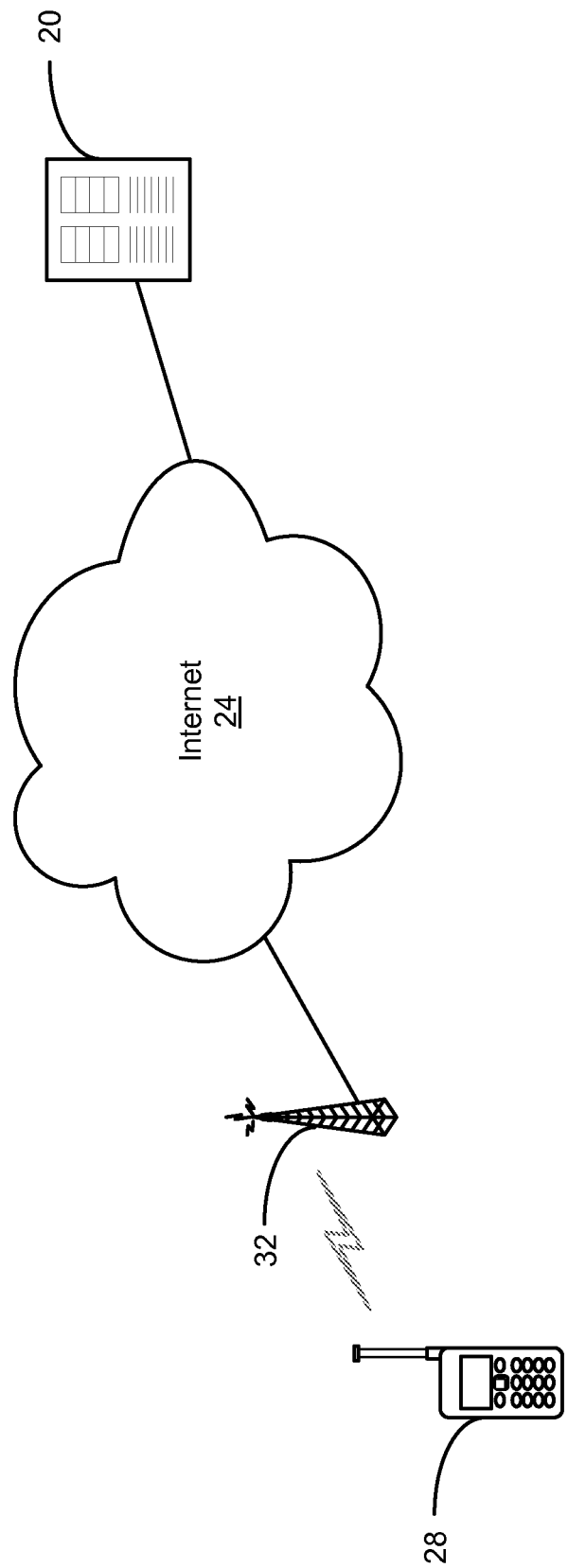
FIG. 1 shows a high-level architecture of a system for recovering a security credential in accordance with an embodiment of the invention and its operating environment.

FIG. 1 is a high-level architectural diagram of a system for secure communication and its operating environment in accordance with an embodiment of the invention. In this embodiment, the two computing devices that communicate securely are a mobile device and a server. The mobile device accesses data and/or functionality available through the server via secure communications, with both requests and responses being encrypted.

As shown in FIG. 1, the system includes a server 20 that generates shared secrets and encryption and decryption keys, and stores the decryption keys in a key database. While only one server 20 is shown, it will be appreciated by those skilled in the art that the functionality/service provided by the server 20 in the described embodiment can be provided by two or more server computers. Where there is more than one server, the servers can be in communication with one another over a local area network, or can be distributed remotely and in communication with each other via one or more communication networks. The server 20 is in communication with a large, public network, such as the Internet 24.

A mobile device 28 is also in communication with the Internet 24 via a cellular communications tower 32. In particular, the mobile device 28 communicates via cellular communications with the cellular communications tower 32 that, in turn, is in communication with the Internet 24 via a number of intermediate servers operated by one or more cellular communications carriers (not shown).

Figure 2:
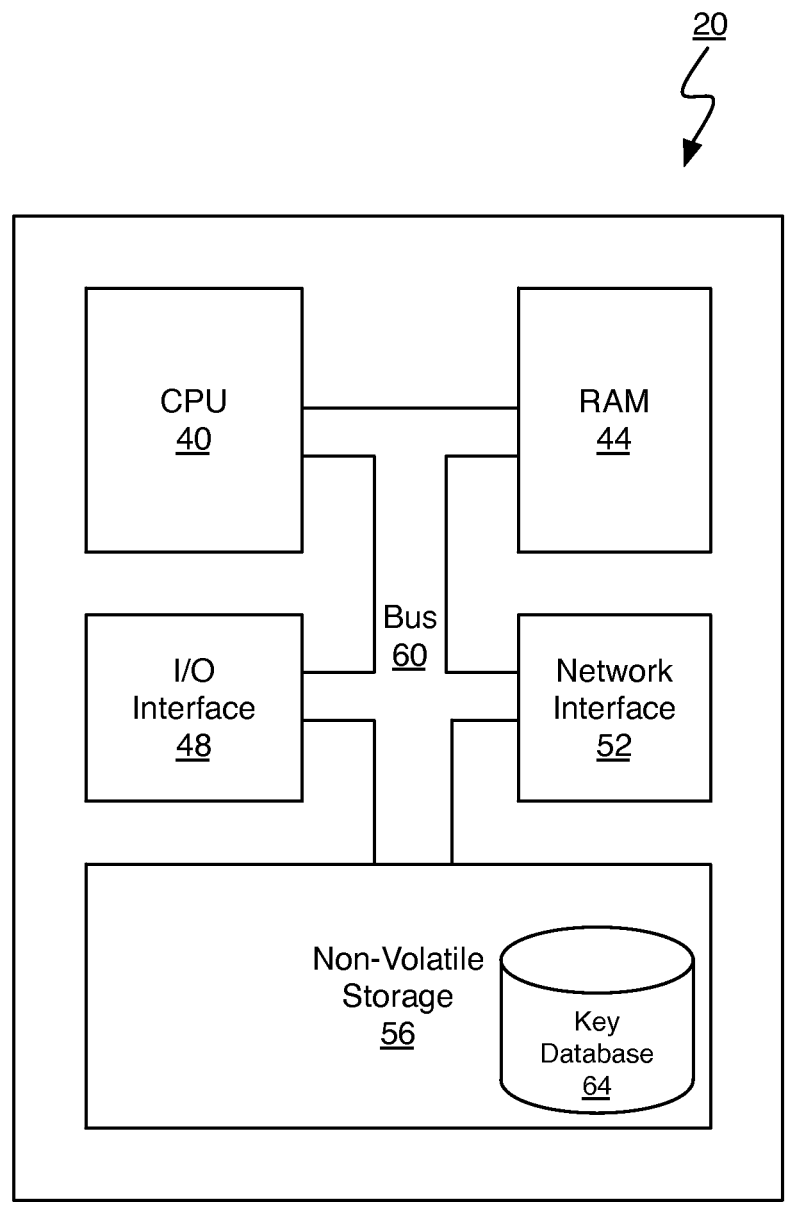
FIG. 2 shows a schematic diagram of the server of FIG. 1.

FIG. 2 shows a number of physical and logical components of the server 20, including a central processing unit ("CPU") 40, random access memory ("RAM") 44, an input/output ("I/O") interface 48, a network interface 52, non-volatile storage 56, and a local bus 60 enabling the CPU 40 to communicate with the other components. The CPU 40 executes an operating system and programs that provide the desired functionality. RAM 44 provides relatively responsive volatile storage to the CPU 40. The I/O interface 48 allows for input to be received from one or more devices, such as a keyboard, a mouse, etc., and outputs information such as to a display and/or speakers. The network interface 52 permits communication with other systems for sending and receiving communications to the mobile device 28. Non-volatile storage 56 stores the operating system and applications. A key database 64 is maintained by the server 20 in the non-volatile storage and stores user account information, mobile device information and decryption keys associated with user accounts. The server 20 includes a Web interface for enabling users to register with the server 20. Further, the server 20 includes various installation versions of one or more applications for installation on the mobile device 28. The versions enable installation of the application on various types of mobile device with varying versions of operating systems.

Figure 3:
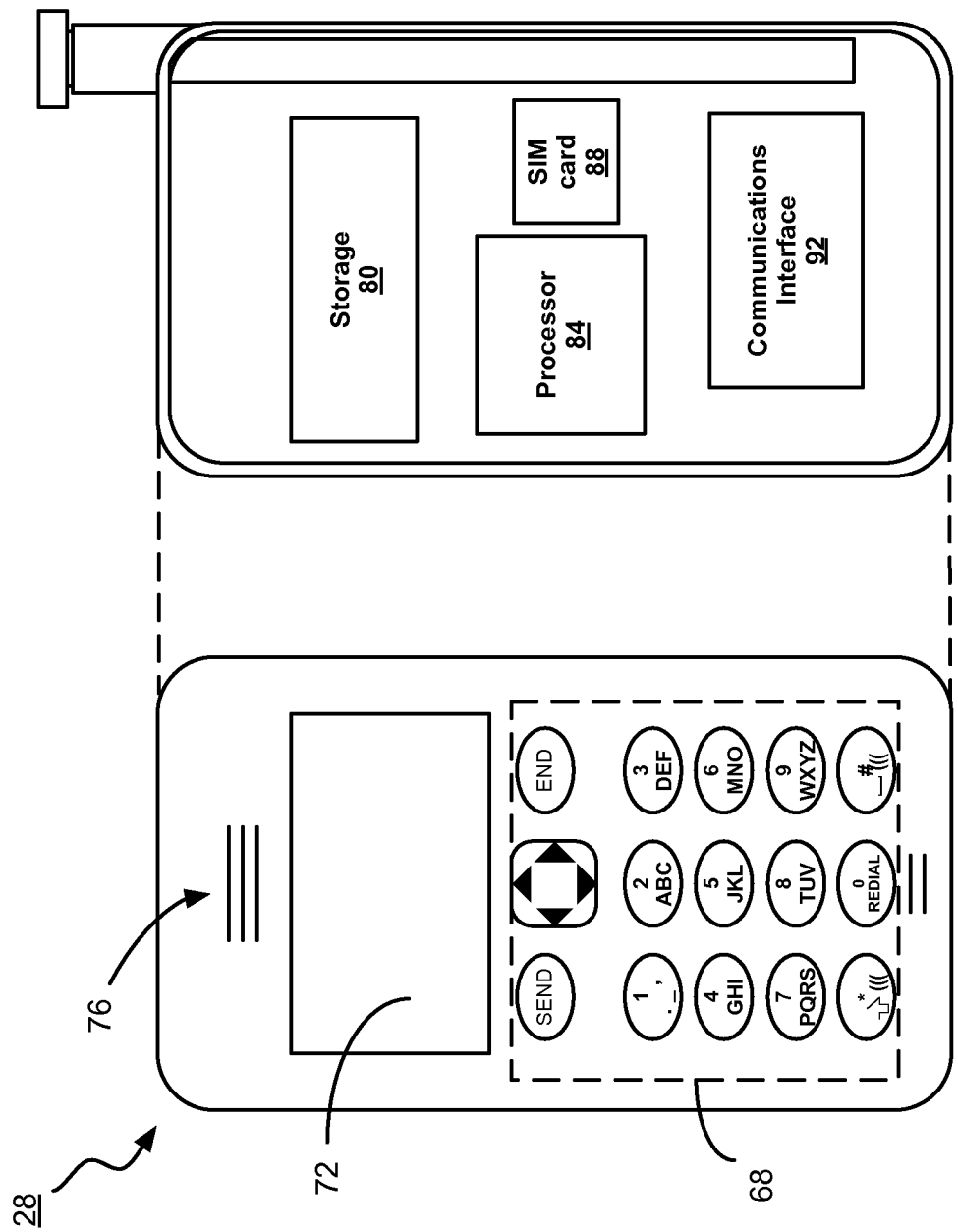
FIG. 3 shows a schematic diagram of the mobile device of FIG. 1.

Referring to FIG. 3, a number of components of the mobile device 28 are shown. The mobile device 28 is a typical mobile phone having basic functions. The mobile device 28 has an input interface 68 for receiving input from a user, a display 72 is provided for presenting information visually to the user, and a speaker 76 for playing audio notifications or other audio output, including voice output, to the user. The mobile device 28 also includes storage 80 for storing an operating system that controls the main functionality of the mobile device 28, along with a number of applications that are run on the mobile device 28, and data. A processor 84 executes the operating system and applications. A SIM card 88 provides additional memory for storing applications and data, and has a microprocessor for executing them. Additionally, the SIM card 88 has a unique hardware identification code that permits identification of the mobile device 28. When installed, the SIM card 88 forms part of the mobile device 28. Other types of mobile devices can have encrypted device memory in place of the SIM card 88 that offers the equivalent functionality. A communications interface 92 permits communications with a cellular network for voice and data. The communications interface 92 also enables communications via other wireless and wired channels, such as Bluetooth and universal serial bus ("USB").

The mobile device 28 executes software, referred to herein as a client application, that includes an encryption module for securing communications with the server 20. In particular, in this embodiment, the client application, when executed, enables secure exchange of data via Global System for Mobile ("GSM") Short Message Service ("SMS") with the server 20. The client application is separate from the native application on the mobile device 28 for transmitting SMS messages. The client application is stored in the storage 80 of the mobile device 28 and executed by the processor 84 when activated by the user (such as by selecting and activating an associated icon in the user interface of the mobile device 28), and its encryption module encrypts communications sent to the server and decrypts communications sent by the server 20. As used herein with respect to this embodiment, the term "client" refers to the mobile device 28 that executes the client application.

Figure 4:
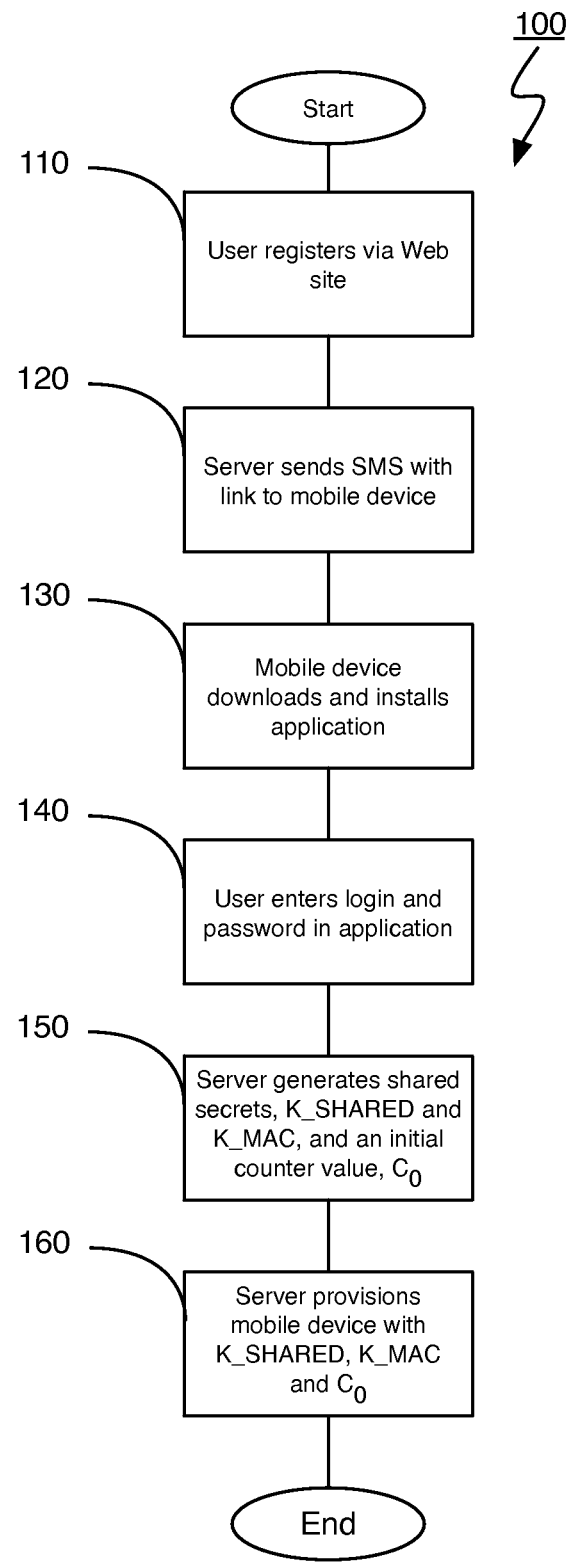
FIG. 4 shows the method of setting up the mobile device for use with the system of FIG. 1.

FIG. 4 shows the general method 100 of setting up the mobile device 28 for use with the server 20. In order to use the system, the user of the mobile device 28 registers with the server 20 via a Web page, either on the mobile device 28 or elsewhere (step 110). The Web page is part of a registration and administration interface for the security credential recovery service that is Web-based. During registration, the user provides his name, a login name and password, and the telephone number associated with the mobile device 28 with which he wishes to securely communicate with the server. In addition, the user is asked to accept an end-user license agreement ("EULA") and privacy policy before access to the server via the mobile device is provided. Once registration is complete, the server 20 sends a short message service ("SMS") message to the mobile device 28 that includes a link for downloading an application (step 120). The SMS message is sent to the mobile device 28 via the telephone number provided by the user at step 110. Upon receipt of the SMS message and activation of the link, the mobile device 28 downloads the application, after which it is installed on the mobile device 28 (step 130). The server 20 receives the download request, determines the type of mobile device in order to deliver an appropriate version of the application to the mobile device 28.

Once the application is installed on the mobile device 28 and started up for the first time, the user is prompted for his login name and password (step 140). The application transmits the user's login name and password securely to the server 20 and, once approved, the server 20 generates a shared secret, K_SHARED, a shared authentication key, K_MAC, and an initial counter value, $C_0$, for the mobile device 28 (step 150). The shared secret is generated using a strong random number generator. The server 20 generates a token ID, "TID", for these security elements and stores it, the shared secret, the shared authentication key and the initial counter value in the key database, together with the other user information.

The server 20 then transmits the shared secret, the shared authentication key, the counter value and the token ID to the mobile device 28 (step 160). Upon receipt of the shared secret, the shared authentication key, the counter value and the token ID, the application executing on the mobile device 28 initializes the encryption module and provides the shared secret, the shared authentication module, the counter value and the token ID to the encryption module (step 170). At this point, the application is ready to communicate securely with the server to access the functionality and/or data available thereon.

During regular operation, the user starts up the application and enters in his login name and password. Upon receiving a request from the user to access functionality and/or data available through the server 20, the application calls upon the encryption module to encrypt the request being sent to the server 20 and to decrypt the response sent by the server 20.

Figure 5A:
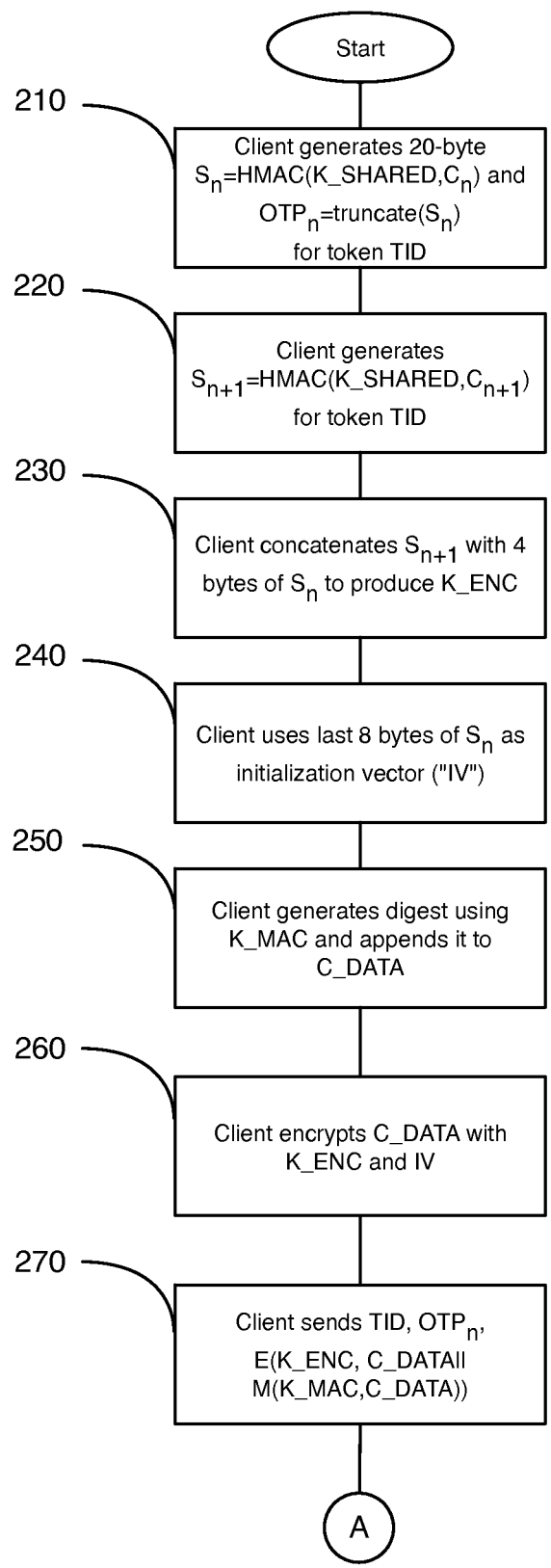
FIGS. 5A and 5B show the general method for secure communication using the system of FIG. 1.
Figure 5B:
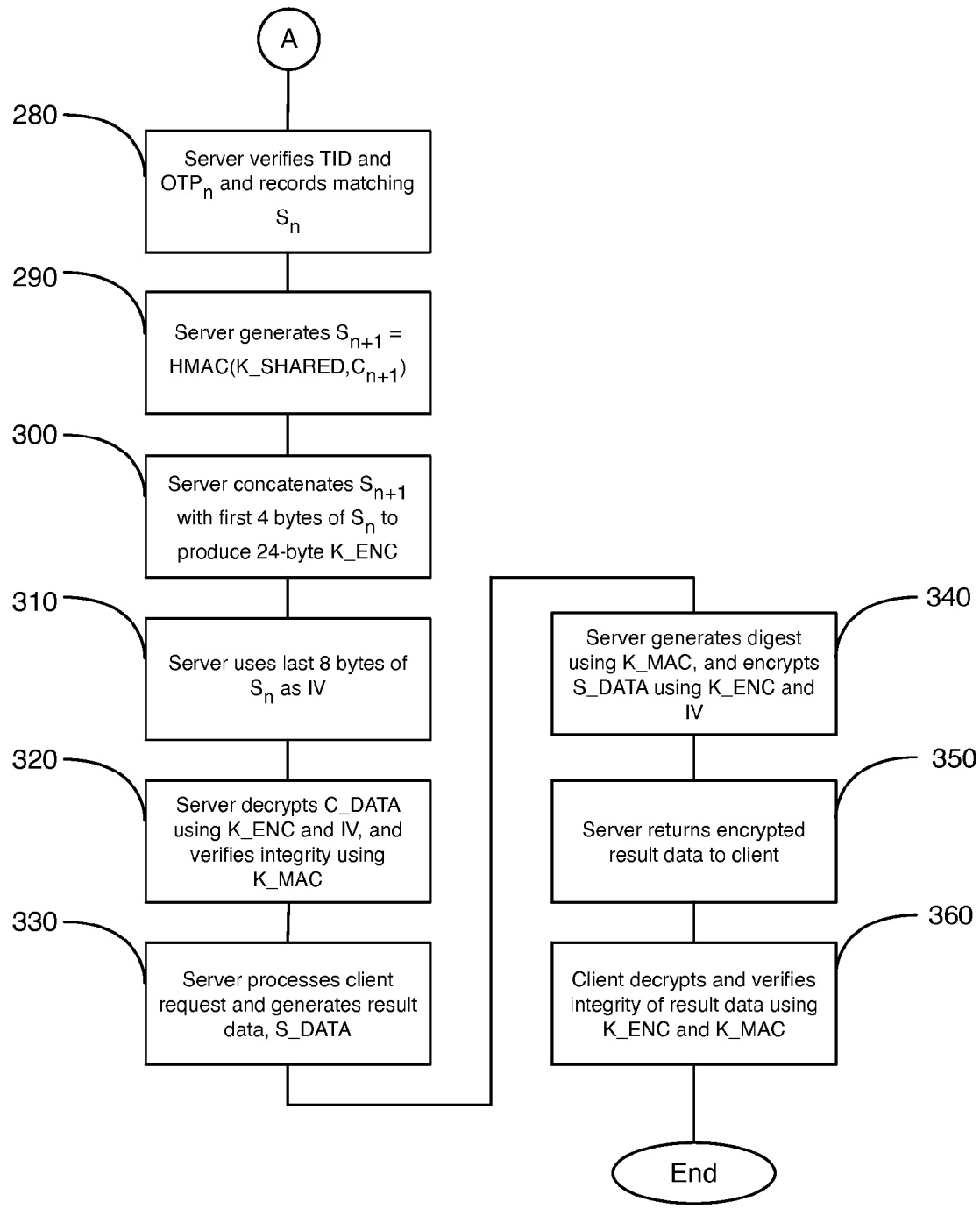

FIGS. 5A and 5B illustrate the method for secure communication using the system shown in FIG. 1 generally at 200. The method begins with the encryption module generating $S_n$, a 20-byte HMAC, and a corresponding $OTP_n$ (step 210). In particular, $$S_n = \text{HMAC}(K\_SHARED, C_n),$$

where n is an incremental variable, and $C_n$ is the $n^{th}$ value of the counter C. The counter C is initialized by the server 20 at a random value, $C_0$, and incremented by one each time a new HMAC is required. The particular HMAC function employed in the embodiment is the HMAC-SHA-1 algorithm, as set out in IETF RFC 2104, although other HMAC functions will occur to those skilled in the art.

After generating $S_n$, the encryption module generates $S_{n+1}$, another 20-byte HMAC, and a corresponding $OTP_{n+1}$ (step 220). In particular, $$S_{n+1} = \text{HMAC}(K\_SHARED, C_{n+1}),$$

where $C_{n+1} = C_n + 1$. Again, the HMAC-SHA-1 algorithm is employed to generate the HMAC, $S_n$.

The encryption module then concatenates $S_{n+1}$ with the first four bytes of $S_n$ to derive the session encryption key, K_ENC (step 230). As the HMAC $S_{n+1}$ is 20 bytes in length, the resulting K_ENC is 24 bytes in length. The encryption module then establishes an initialization vector ("IV") of the last eight bytes of the HMAC $S_n$ (step 240). The encryption module generates a message digest using the shared K_MAC, and concatenates the encryption key, K_ENC, with the initialization vector, IV, using this to encrypt data generated by the application (step 250). The message data, C_DATA, in this case, takes the form of extensible mark-up language ("XML"). Those skilled in the art, however, will appreciate that the message data could also be in any of a number of other formats. A message digest is generated for C_DATA using K_MAC and appended to the data. The encryption module then encrypts C_DATA and the appended message digest using the derived session encryption key K_ENC and appended initialization vector IV (step 260). Specifically, Triple Data Encryption Algorithm (referred to commonly as "Triple DES") is used to encrypt C_DATA and the appended message digest using the 32-byte concatenated K_ENC and IV. Upon encrypting C_DATA and the appended message digest, the application executing on the mobile device sends the encrypted message data and message digest to the server 20 via the communications interface 92 of the mobile device 28 (step 270). The application appends the token ID, TID, and $OTP_n$. The TID permits the server 20 to reference the corresponding shared secret, K_SHARED, stored in the key database 64, and $OTP_n$ enables synchronization of the counter values between the mobile device 28 and the server 20.

Upon receipt of the communication, the server 20 verifies the TID, retrieves the corresponding shared secrets, K_SHARED and K_MAC, and the last known counter value, referred to as $C_m$ (step 280). Using the last known counter value, $C_m$, and the shared secrets, the server 20 proceeds to increment $C_m$ by one and generate an HMAC using K_SHARED and the new counter value. Once the HMAC is generated, the server 20 then generates a corresponding OTP:

$$OTP_{m+1} = \text{Truncate}(\text{HMAC}(K\_SHARED, C_{m+1}))$$

If the resulting $OTP_{m+1}$ matches $OTP_n$ provided in the communication from the mobile device 28, then the counter value, $C_n = C_{m+1}$. If not, then the server 20 iteratively increments $C_{m+1}$ and tests the successive counter values as noted above until $C_n$ is found or a set number of tries to match the counter values has been attempted, after which the server 20 determines that the communication is invalid. If the communication is deemed invalid, the server 20 responds back to the mobile device 28 with an error message. Once $C_n$ has been discovered, the server 20 records the corresponding $S_n$=HMAC (K_SHARED, $C_n$).

The server 20 then determines the subsequent counter value, $C_{n+1}$, and uses it to generate the corresponding HMAC (step 290):

$$S_{n+1}=\text{HMAC}(K\_SHARED, C_{n+1})$$

The corresponding 24-byte encryption key, K_ENC, is then derived by the server 20 by concatenating $S_{n+1}$ with the first four bytes of $S_n$ (step 300). The server 20 then generates the initialization value, IV, as the last eight bytes of $S_n$ (step 310). Using K_ENC concatenated with IV, the server 20 decrypts the encrypted C_DATA and appended message digest, and generates the message digest independently using the K_MAC corresponding to the TID in the communication from the mobile device 28 to verify the integrity of the message data (step 320).

Once the message data, C_DATA, has been decrypted and verified, the server 20 processes the message data and generates a response in the form of message data, S_DATA (step 330). Again, the data is in XML format, but could be in any of a number of other formats. The server 20 then generates a message digest for S_DATA using the retrieved K_MAC, appends the message digest to S_DATA, and encrypts S_DATA and the appended message digest using the concatenated K_ENC and IV (step 340). The server 20 then communicates the encrypted response to the mobile device 28 (step 350).

Upon receipt of the response from the server 20, the application on the mobile device 28 directs the encryption module to decrypt the message data and verify the integrity of the message data, S_DATA (step 360). In particular, the encryption module decrypts the communication from the server 20 using the cached K_ENC concatenated with IV that it saved from when it generated the encrypted message data. The encryption module verifies the integrity of the message data, S_DATA, by independently generating the message digest and checking to ensure that it matches the message digest generated by the server 20. Upon decryption and verification of S_DATA, it is outputted by the encryption module for use by the application executing on the mobile device 28.

For each subsequent communication, the counter value is increased and a new session encryption key, K_ENC, is derived.

While the invention has been described with specificity to the use of SHA-1, those skilled in the art will appreciate that other types of hash-based message authentication codes can be employed. For example, SHA-256 or SHA-512 can be used in place of SHA-1.

The encryption key can be derived using other functions of two or more HMACs, such as PKCS#5 and other key derivation functions.

Other types of encryption can be used for encrypting the message apart from Triple DES. For example, Advanced Encryption Standard ("AES") can be used without affecting the working of the invention.

Different functions of the first and second HMACs can be used to generate the encryption key and the initialization vector. In one embodiment, the encryption key is derived from a portion of one of the HMACs and the initialization vector is generated from a portion of the other HMAC. In another embodiment, both the encryption key and the initialization vector are generated using the two HMACs.

Where an initialization vector is employed, other functions for generating it will occur to those skilled in the art.

In some cases, it may not be necessary to transmit the token ID. For example, where hardware identifiers are accessible, the hardware identifier can be identified during provisioning of the application on the computing device and can be registered with the security elements stored in the key database. Upon receipt of a communication, the hardware identifier can be used to look up the requisite security elements for authenticating, verifying and/or decrypting the message.

The session key can be used for a single communication from one computing device to another. Alternatively, the session key can be used for multiple communications for a session or transaction. Further, where message data is too large to be transmitted in a single communication, such as an SMS message, the message data can be split and each portion can be encrypted using the same or separate encryption keys.

Other types of computing devices can be set up to work with the invention. For example, a mobile device can be paired via a hardwire connection to a personal computer for provisioning and can thereafter use the invention to carry out communications with the personal computer securely, such as for synchronizing data, etc.

While the invention was described with respect to an SMS client application executing on a mobile device, those skilled in the art will appreciate that a number of other types of software and/or hardware could be used. For example, a plug-in can be provided to adapt a native SMS client on a mobile device to conduct secure communications using the general method described above.

The software for enabling secure communications could be any computer-executable instructions for communicating securely with another computing device, and could be implemented in firmware, an operating system, an application, etc. The computer-executable instructions can reside in the storage of the computing device. Alternatively, the computer-readable instructions can reside in the storage of a subscriber identification module ("SIM") card that, when inserted in a mobile phone, form part of that computing device. The computer-readable instructions can be made available via download or can be distributed on a computer-readable medium.

While the HMACs are described above as being generated using counters, other methods can be employed. For example, the HMACs can be generated using a moving factor that is based on time, for example.

The information in the communications can be outputted in a number of ways. For example, the information can saved in storage, displayed, printed or passed to an application for further processing.

The invention could be employed to secure communications for a variety of data types, such as, for example, email, MMS, instant messages, etc.

Those skilled in the art will appreciate that, in some cases, the lengths of the various elements used, such as the keys and the initialization vector, could be varied without significantly affecting the invention.

The above-described embodiments are intended to be examples of the present invention and alterations and modifications may be effected thereto, by those of skill in the art, without departing from the scope of the invention, which is defined solely by the claims appended hereto.

What is claimed is:

1. A method for secure communication using hash-based message authentication codes, comprising:
   generating by a server a shared secret, a first counter value and a second counter value;
   generating by an encryption module executed on a computing device a first hash-based message authentication code from said shared secret and said first counter value stored in storage of said computing device;

generating by said encryption module executed on said computing device a second hash-based message authentication code from said shared secret and said second counter value;

deriving by said encryption module executed on said computing device an encryption key from a first function of said first hash-based message authentication code and said second hash-based message authentication code; wherein said first function includes at least a portion of a concatenation of said first and second hash-based message authentication codes; and encrypting by said encryption module executed on said computing device a message using said encryption key; and communicating said encrypted message via a network interface of said computing device.

2. The method of claim 1, further comprising:
generating a one-time password using one of said first and second hash-based message authentication codes.

3. The method of claim 2, further comprising:
communicating said one-time password to enable determination of one of said first and second counter values.

4. The method of claim 1, further comprising:
combining said encryption key with an initialization vector for decrypting said message.

5. The method of claim 1, wherein said encrypting comprises:
generating an initialization vector as a second function of at least one of said first and second hash-based message authentication codes; and
encrypting said message using said encryption key concatenated with said initialization vector.

6. The method of claim 5, wherein said generating comprises setting said initialization vector as a portion of said second hash-based message authentication code.

7. The method of claim 1, further comprising:
communicating an identifier for said shared secret and said counter with said encrypted message.

8. The method of claim 1, further comprising:
receiving an encrypted response; and
decrypting said encrypted response using said encryption key.

* * * * *